United States Patent
Guo

(10) Patent No.: US 8,619,641 B2
(45) Date of Patent: Dec. 31, 2013

(54) SINGLE-USER BEAMFORMING METHOD AND APPARATUS SUITABLE FOR FREQUENCY DIVISION DUPLEX SYSTEM

(75) Inventor: Yang Guo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 436 days.

(21) Appl. No.: 12/991,144

(22) PCT Filed: Dec. 7, 2009

(86) PCT No.: PCT/CN2009/075351
§ 371 (c)(1),
(2), (4) Date: Nov. 5, 2010

(87) PCT Pub. No.: WO2010/121473
PCT Pub. Date: Oct. 28, 2010

(65) Prior Publication Data
US 2011/0064008 A1 Mar. 17, 2011

(30) Foreign Application Priority Data

Apr. 20, 2009 (CN) .......................... 2009 1 0134975

(51) Int. Cl.
*H04J 1/00* (2006.01)
(52) U.S. Cl.
USPC .......................................... 370/281; 370/343
(58) Field of Classification Search
None
See application file for complete search history.

(56) References Cited

U.S. PATENT DOCUMENTS

| 6,782,255 | B1 | 8/2004 | Ranta | |
|---|---|---|---|---|
| 2007/0099578 | A1* | 5/2007 | Adeney et al. | 455/69 |
| 2008/0080421 | A1* | 4/2008 | Yu et al. | 370/329 |
| 2008/0159122 | A1 | 7/2008 | Dor | |
| 2009/0322613 | A1* | 12/2009 | Bala et al. | 342/373 |
| 2010/0008268 | A1* | 1/2010 | Whinnett et al. | 370/295 |
| 2010/0067480 | A1* | 3/2010 | Wang et al. | 370/330 |
| 2011/0064156 | A1* | 3/2011 | Kim et al. | 375/267 |

FOREIGN PATENT DOCUMENTS

| CN | 1461159 A | 12/2003 |
|---|---|---|
| CN | 1665161 A | 9/2005 |
| CN | 101072066 A | 11/2007 |

(Continued)

OTHER PUBLICATIONS

International Search Report on international application No. PCT/CN2009/075351, mailed on Feb. 11, 2010.

(Continued)

*Primary Examiner* — Min Jung
(74) *Attorney, Agent, or Firm* — Fredrikson & Byron, PA

(57) ABSTRACT

The present invention provides a single-user beamforming method suitable for a frequency division duplex system, comprising the following steps: obtaining a first transmission weight and a second transmission weight according to an uplink signal; using the first transmission weight to weight after adding a dedicated pilot of a layer 1 to a to-be-transmitted first data stream, and using the second transmission weight to weight after adding a dedicated pilot of a layer 2 to a to-be-transmitted second data stream; mapping the weighted first data stream to an antenna, mapping the weighted second data stream to the antenna, and sending them after superimposing them at the antenna port. The present invention also provides a single-user beamforming apparatus suitable for a frequency division duplex system. The present invention can send two data streams to one user at the same time, so it increases throughputs of user and system.

13 Claims, 3 Drawing Sheets

(56) References Cited

FOREIGN PATENT DOCUMENTS

| CN | 101091344 A | 12/2007 |
|---|---|---|
| CN | 101383649 A | 3/2009 |
| CN | 101394213 A | 3/2009 |
| WO | 9934532 A2 | 7/1999 |
| WO | 2008082848 A1 | 7/2008 |

OTHER PUBLICATIONS

English Translation of the Written Opinion of the International Search Authority in international application No. PCT/CN2009/075351, mailed on Feb. 11, 2010.

Supplementary European Search Report in European application No. 09843577.9, mailed Mar. 25, 2011.

Ericsson et al, "On dual layer beamforming," 3GPP Draft: R1-091318, 3rd Generation Partnership Project (3GPP), Mar. 13, 2009.

Catt et al, "Beam-forming in E-UTRA and Way forward," 3GPP Draft; R1-070840, 3rd Generation Partnership Project (3GPP), vol. RAN WG1, Feb. 6, 2007.

Alcatel-Lucent et al., "Support Multi-layer Beamforming in LTE," eGPP Draft; R1-091474 MultilayerBF, 3rd Generation Partnership Project (3GPP), Mar. 18, 2009.

\* cited by examiner

SINGLE-USER BEAMFORMING METHOD AND APPARATUS SUITABLE FOR FREQUENCY DIVISION DUPLEX SYSTEM

RELATED APPLICATIONS

This application is a U.S. 371 national stage entry of International Application No. PCT/CN2009/075351 filed Dec. 7, 2009, which claims priority to Chinese Patent Application No. 200910134975.2, filed Apr. 20, 2009, the teachings of which are incorporated herein by reference.

TECHNICAL FIELD

The present invention relates to a smart antenna beamforming technology in a multiple input and multiple output (MIMO) wireless mobile communication system, particularly to a single-user beamforming method and apparatus suitable for a frequency division duplex system.

BACKGROUND

A characteristic of a beamforming technology is in controlling the direction of a beam, and it distinguishes users by their positions, so that multi-user can reuse the same time and frequency resources. Small antenna distance (0.5 λ) and spacious suburban scene are fit to apply the beamforming technology.

The beamforming technology uses antenna array structure to obtain the beam in a characteristic direction, so that it can obtain obvious beam energy gain, and the feature of the technology can be used to promote cell coverage, decrease system interference and increase system capacity, at the same time it can also improve reliability of links, peak rate and effectively improve the performance of edge users.

Because an MIMO technology can effectively improve channel capacity, it becomes a very attractive technology in an LTE (long term evolution) research.

In multi-user MIMO mode, it is possible to design beamforming direction, control the concrete form of beam pattern, distinguish signals from multi-user and remove interference between users by designing proper weight vector of transmitting antennas and receiving antennas. However, in existing single-user beamforming technology, one data stream can simultaneously be sent only by one beam, so throughputs of user and system are lower.

SUMMARY

The present invention provides a single-user beamforming method and apparatus suitable for a frequency division duplex system, to solve the problem of lower throughputs of user and system when using single-user beamforming technology to send data in an FDD system.

To solve the above-mentioned problem, the present invention provides a single-user beamforming method suitable for a frequency division duplex system, the method comprises:

obtaining a first transmission weight and a second transmission weight according to an uplink signal;

using the first transmission weight to weight after adding a dedicated pilot of a layer 1 to a to-be-transmitted first data stream, and using the second transmission weight to weight after adding a dedicated pilot of a layer 2 to a to-be-transmitted second data stream; and mapping the weighted first data stream to an antenna, mapping the weighted second data stream to the antenna, and sending them after superimposing them at the antenna port.

Further, the above-mentioned method may also have the following characteristics, the first transmission weight and the second transmission weight may be orthogonal.

Further, the above-mentioned method may also have the following characteristics, the first transmission weight and second transmission weight may be obtained by the following method:

obtaining two directions of arrival DOA 1 and DOA 2 of which the power of the uplink signal is maximal according to uplink sounding reference signals; and obtaining the first transmission weight and the second transmission weight according the DOA 1 and the DOA 2 respectively.

Further, the above-mentioned method may also have the following characteristics, the obtaining the first transmission weight and the second transmission weight according the DOA 1 and the DOA 2 may specifically comprise:

obtaining a transmission weight W1 and a transmission weight W2 according to the DOA 1 and the DOA 2 respectively; and obtaining the first transmission weight and the second transmission weight after performing normalization processing of the transmission weight W1 and the transmission weight W2 or after performing normalization processing and orthogonalization processing of the transmission weight W1 and the transmission weight W2.

Further, the above-mentioned method may also have the following characteristics, a receiving end may perform signal demodulation according to the dedicated pilot after receiving data streams, rank indicator information and channel quality indicator information of every data stream may be fed back, and precoding matrix indicator information may not be fed back.

The present invention also provides a single-user beamforming apparatus suitable for a frequency division duplex system, the apparatus comprises:

a transmission weight acquisition unit, which is used to obtain a first transmission weight and a second transmission weight according to an uplink signal;

a data processing unit, which is used to weight a first data stream by using the first transmission weight after adding a dedicated pilot of a layer 1 to a to-be-transmitted first data stream, and to weight a second data stream by using the second transmission weight after adding a dedicated pilot of a layer 2 to a to-be-transmitted second data stream;

a mapping unit, which is used to map the weighted first data stream to an antenna, is and to map the weighted second data stream to the antenna; and a transmission unit, which is used to superimpose the weighted first data stream and the weighted second data stream at the antenna port and then send them.

Further, the above-mentioned apparatus may also have the following characteristics, the first transmission weight and the second transmission weight obtained by the transmission weight acquisition unit may be orthogonal.

Further, the above-mentioned apparatus may also have the following characteristics, the transmission weight acquisition unit may further include:

a direction of arrival acquisition module, which is used to obtain two directions of arrival DOA 1 and DOA 2 of which the power of the uplink signal is maximal according to uplink sounding reference signals; and a transmission weight acquisition module, which is used to obtain the first transmission weight and the second transmission weight according to the DOA 1 and the DOA 2.

Further, the above-mentioned apparatus may also have the following characteristics, the transmission weight acquisition module may further comprise:

a first processing module, which is used to obtain a transmission weight W1 and a transmission weight W2 according to the DOA 1 and the DOA 2 respectively; and a second processing module, which is used to obtain the first transmission weight and the second transmission weight after performing normalization processing of the transmission weight W1 and the transmission weight W2 or after performing normalization processing and orthogonalization processing of the transmission weight W1 and the transmission weight W2.

The data processing unit may further comprise:

a first weight unit, which is used to weight the first data stream by using the first transmission weight after adding a dedicated pilot of the layer 1 to the to-be-transmitted first data stream, and then to send the weighted first data stream to the mapping unit; and a second weight unit, which is used to weight the second data stream by using the second transmission weight after adding a dedicated pilot of the layer 2 to the to-be-transmitted second data stream, and then to send the weighted second data is stream to the mapping unit.

Further, the above-mentioned apparatus may also have the following characteristics, the single-user beamforming apparatus may be located on an evolved nodeB.

So far, according to the existing single-user beamforming technology one data stream may be sent to one user, but according to the scheme of the present invention two data streams may be sent to one user at the same time, so that it could increase the throughputs of user and system.

DETAILED DESCRIPTION

The present invention will be described in details with reference to embodiments and drawings.

As to LTE-A system, an existing single-stream beamforming technology can be extended to a multi-stream beamforming technology, which is still applied to a single-user so as to improve a throughput of user.

Figure 1:
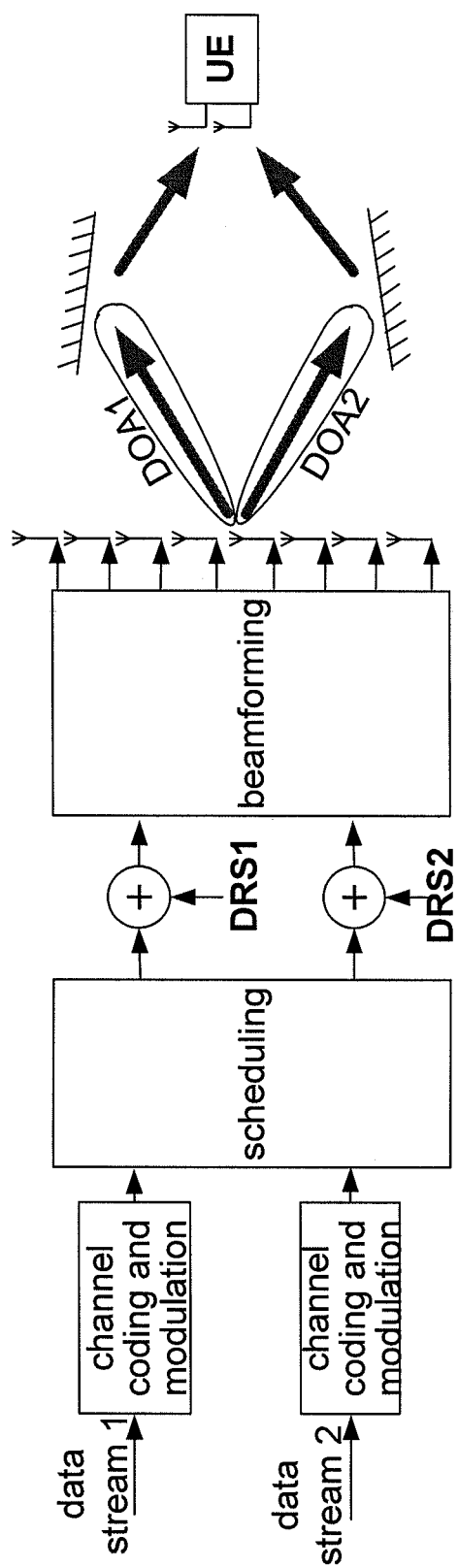
FIG. 1 is a principle diagram of a single-user beamforming method for an FDD system in the present invention.

FIG. 1 is a principle diagram of a single-user beamforming method in the present invention. Wherein, after channel coding and modulation, scheduling and loading dedicate reference signals (DRS), a data stream 1 and a data stream 2 can be proceeded beamforming and then be transmitted by an antenna.

Figure 2:
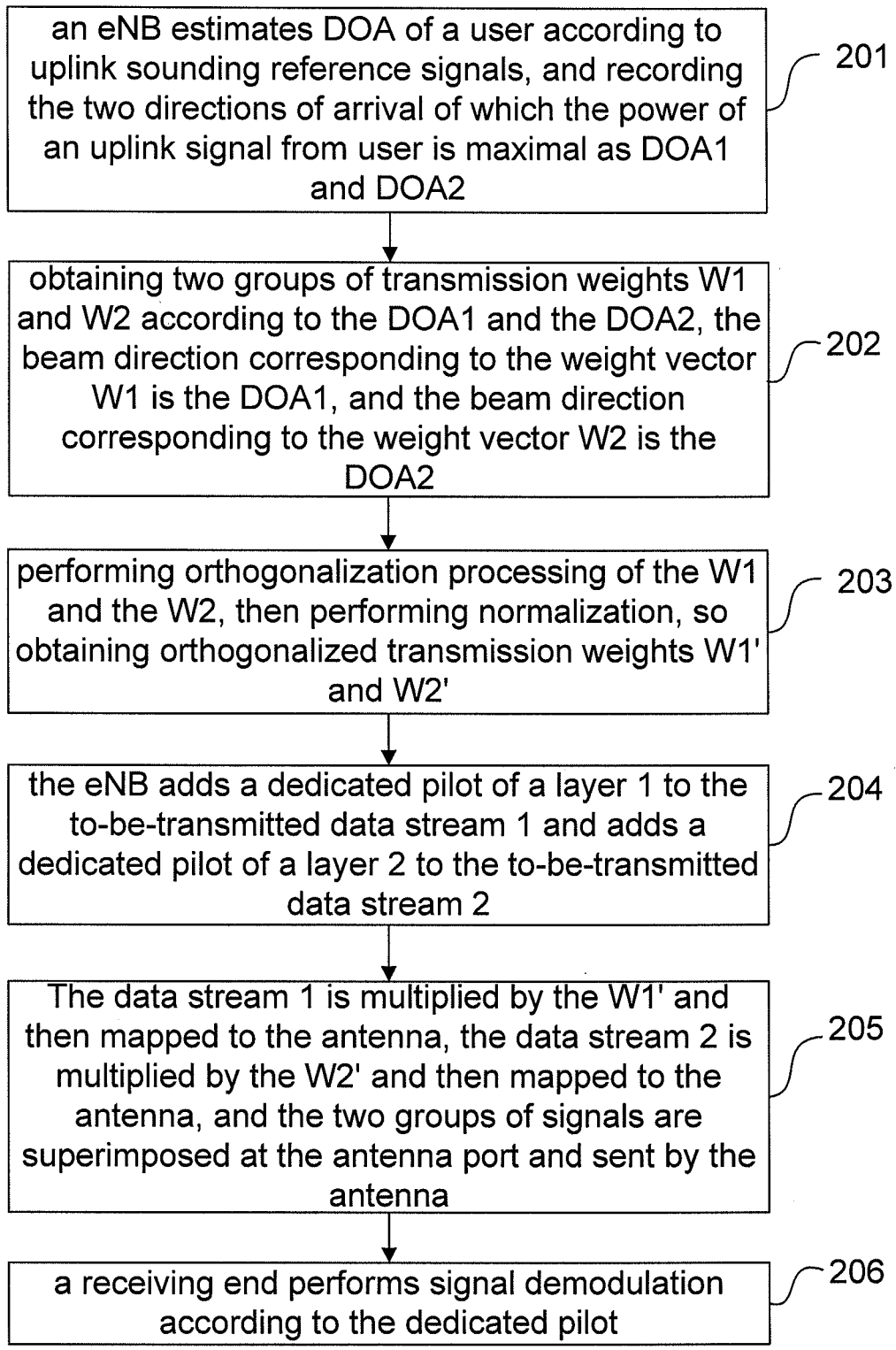
FIG. 2 is a flowchart of a single-user beamforming method for an FDD system in the present invention.

FIG. 2 is a flowchart of a single-user beamforming method for an FDD system in the present invention, comprises:

step 201, an evolved nodeB (eNB) estimates direction of arrival (DOA) of a user according to uplink sounding reference signals (SRS), here it needs estimation in order to obtain the directions of arrival of which the power of an uplink signal from user is maximal, and recording the two directions of arrival as DOA 1 and DOA 2.

The space channel where user are on is a complex space physical environment, a scatterer would make a receiving signal composed of several sub-path signals, so it is needed to estimate two directions of sub-path of which the power of the signal is maximal.

Step 202, obtaining two groups of transmission weights W1 and W2 respectively according to the DOA 1 and the DOA 2, the beam direction corresponding to the weight vector W1 is the DOA 1, and the beam direction corresponding to the weight vector W2 is the DOA 2.

Step 203, performing orthogonalization processing of the W1 and the W2, then performing normalization, so obtaining orthogonalized and normalized transmission weights W1' and W2'.

A advantage of performing orthogonalization processing is that the W1' and the W2' are orthogonal to each other, so that the interference between two data streams could be decreased.

The W1 and the W2 could be used as subsequent transmission weight after being performed normalization processing without performing orthogonalization processing.

Step 204, the eNB adds a dedicated pilot of a layer 1 to the to-be-transmitted data stream 1 and adds a dedicated pilot of a layer 2 to the to-be-transmitted data stream 2, and the two data streams will be sent to one user.

The dual-layer DRS is needed to use in the present invention.

Step 205, the data stream 1 is mapped to the antenna after being weighted by the transmission weight W1', and the data stream 2 is mapped to the antenna after being weighted by the transmission weight W2', then the two data streams are sent after being superimposed at the antenna port.

The data stream 1 is multiplied by the W1' and then mapped to the antenna, the data stream 2 is multiplied by the W2' and then mapped to the antenna, and the two groups of signals are superimposed at the antenna port. The superimposed signals are sent by the antenna to complete downlink beamforming process.

Step 206, a receiving end (user equipment side) performs signal demodulation according to the dedicated pilot after receiving data streams.

A terminal uses the received dedicated pilot of the layer 1 as reference to demodulate the data stream 1, and uses the received dedicated pilot of the layer 2 as reference to demodulate the data stream 2.

In another embodiment of the present invention, the transmission weights W1' and W2' may also be obtained by other methods, not limited to use SRS pilots, and also not limited to use DOA parameters to estimate, and may also be obtained by other estimation methods, for example an eigenvalue decomposition method and so on, and the W1' and the W2' may be orthogonal or not orthogonal to each other.

When using the single-user beamforming method of the present invention, the sending of feedback information could be modified, RI (rank indicator) information and CQI (channel quality indicator) information of every data stream may be fed back, and PMI (precoding matrix indicator) information may not be fed back. The detailed modification of method and format to feedback signalings is as follows:

in an FDD mode, the present invention does not need PMI feedback, and when defining new DCI mode, the saved feedback space can be used to transport other signalings, and the PMI feedback space may also be cancelled.

In existing technology only CQI information of one data stream is fed back, however, every data stream is needed to be fed back respectively in the present invention, and the interference between users is greatly effected by matching situation and used precoding vectors. The CQI estimation method under the FDD mode in the present invention can adopt a method in which UE may feedback based on estimating CQI information of all public pilots. The eNB can adjust and modify the CQI information reported by the UE according to the interference situation between the data streams.

A rank estimation method: in existing technology, there is only one data stream (layer), so Rank is 1; but in the present invention, Rank may be 1 or 2, so it needs feedback, under the FDD mode, because the CQI information estimation uses the public pilots to obtain channel information, the UE needs to estimate the RI and feed back to the eNB.

The present invention is suitable for LTE+FDD system.

Figure 3:
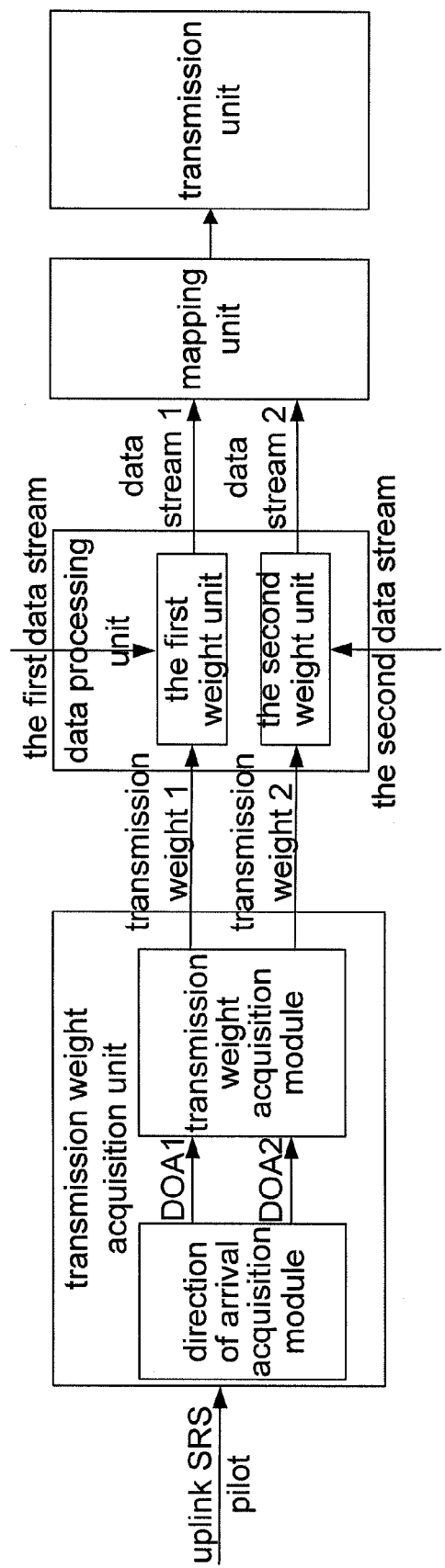
FIG. 3 is a structure diagram of a single-user beamforming apparatus for an FDD system in the present invention.

FIG. 3 is a structure diagram of a single-user beamforming apparatus for an FDD system in the present invention, and the apparatus which is located on the eNB comprises:

a transmission weight acquisition unit, which is used to obtain a first transmission weight and a second transmission weight according uplink signals; wherein, the first transmission weight and the second transmission weight are orthogonal to each other;

a data processing unit, which is used to weight the first data stream and the second data stream by the first transmission weight and the second transmission weight respectively after adding dedicated pilots of a layer 1 and a layer 2 to the first data stream and the second data stream respectively;

a mapping unit, which is used to map the weighted first data stream to an antenna and map the weighted second data stream to the antenna; and a transmission unit, which is used to superimpose the weighted first data stream and the weighted second data stream at the antenna port and then send them.

The transmission weight acquisition unit further includes:

a direction of arrival acquisition module, which is used to obtain two directions of arrival DOA 1 and DOA 2 of which the power of the uplink signal is maximal according to uplink sounding reference signals; and a transmission weight acquisition module, which is used to obtain the first transmission weight and the second transmission weight according to the DOA 1 and the DOA 2 respectively.

The transmission weight acquisition module further comprises:

a first processing module, which is used to obtain a transmission weight W1 and a transmission weight W2 according the DOA 1 and the DOA 2 respectively; and a second processing module, which is used to obtain the first transmission weight and the second transmission weight after performing normalization processing of the transmission weight W1 and the transmission weight W2 or after performing normalization processing and orthogonalization processing of the transmission weight W1 and the transmission weight W2.

The data processing unit further comprises:

a first weight unit, which is used to weight the first data stream by using the first transmission weight after adding a dedicated pilot of the layer 1 to the to-be-transmitted first data stream, and then to send the weighted first data stream to the mapping unit; and a second weight unit, which is used to weight the second data stream by using the second transmission weight after adding a dedicated pilot of the layer 2 to the to-be-transmitted second data stream, and then to send the weighted second data stream to the mapping unit.

The present method of the present invention can send two data streams to one user at the same time, so it increases the throughputs of user and system.

The above description are only the preferred embodiments of the present invention, and are not used to restrict the protect scope of the present invention.

What is claimed is:

1. A single-user beamforming method suitable for a frequency division duplex system, comprising:

obtaining a first transmission weight and a second transmission weight from an uplink signal;

adding a first dedicated pilot into a first data stream of a single-user, multiplying the first data stream with the first transmission weight;

adding a second dedicated pilot into a second data stream of the single-user, multiplying the second data stream with the second transmission weight;

superimposing and sending the first data stream and the second data stream at an antenna port;

wherein the first dedicated pilot is dedicated to the first data stream, and the second dedicated pilot is dedicated to the second data stream.

2. The method according to claim 1, wherein the first transmission weight and the second transmission weight are orthogonal.

3. The method according to claim 2, further comprising: a receiving end performing signal demodulation according to the dedicated pilot after receiving data streams, rank indicator information and channel quality indicator information of every data stream being fed back, and precoding matrix indicator information being not fed back.

4. The method according to claim 1, wherein the first transmission weight and second transmission weight are obtained by the following method:

obtaining two directions of arrival DOA 1 and DOA 2 of which the power of the uplink signal is maximal according to uplink sounding reference signals; and obtaining the first transmission weight and the second transmission weight according the DOA 1 and the DOA 2 respectively.

5. The method according to claim 4, wherein the obtaining the first transmission weight and the second transmission weight according the DOA 1 and the DOA 2 specifically comprises:

obtaining a transmission weight W1 and a transmission weight W2 according to the DOA 1 and the DOA 2 respectively; and obtaining the first transmission weight and the second transmission weight after performing normalization processing of the transmission weight W1 and the transmission weight W2 or after performing normalization processing and orthogonalization processing of the transmission weight W1 and the transmission weight W2.

6. The method according to claim 5, further comprising: a receiving end performing signal demodulation according to the dedicated pilot after receiving data streams, rank indicator information and channel quality indicator information of every data stream being fed back, and precoding matrix indicator information being not fed back.

7. The method according to claim 4, further comprising: a receiving end performing signal demodulation according to the dedicated pilot after receiving data streams, rank indicator information and channel quality indicator information of every data stream being fed back, and precoding matrix indicator information being not fed back.

8. The method according to claim 1, further comprising: a receiving end performing signal demodulation according to the dedicated pilot after receiving data streams, rank indicator information and channel quality indicator information of every data stream being fed back, and precoding matrix indicator information being not fed back.

9. A single-user beamforming apparatus suitable for a frequency division duplex system, comprising:
- a transmission weight acquisition unit, which is used to obtain a first transmission weight and a second transmission weight from an uplink signal;
- a data processing unit, which is used to add a first dedicated pilot into a first data stream of a single-user, and to multiply the first data stream with the first transmission weight; to add a second dedicated pilot into a second data stream of the single-user, and to multiply the second data stream with the second transmission weight; wherein the first dedicated pilot is dedicated to the first data stream, and the second dedicated pilot is dedicated to the second data stream;
- a transmission unit, which is used to superimpose the first data stream and the second data stream at an antenna port and then send them.

10. The apparatus according to claim 9, wherein the first transmission weight and the second transmission weight obtained by the transmission weight acquisition unit are orthogonal.

11. The apparatus according to claim 9, wherein the transmission weight acquisition unit further includes:
- a direction of arrival acquisition module, which is used to obtain two directions of arrival DOA 1 and DOA 2 of which the power of the uplink signal is maximal according to uplink sounding reference signals; and
- a transmission weight acquisition module, which is used to obtain the first transmission weight and the second transmission weight according to the DOA 1 and the DOA 2.

12. The apparatus according to claim 11, wherein the transmission weight acquisition module further comprises:
- a first processing module, which is used to obtain a transmission weight W1 and a transmission weight W2 according to the DOA 1 and the DOA 2 respectively; and
- a second processing module, which is used to obtain the first transmission weight and the second transmission weight after performing normalization processing of the transmission weight W1 and the transmission weight W2 or after performing normalization processing and orthogonalization processing of the transmission weight W1 and the transmission weight W2.

13. The apparatus according to claim 9, wherein the single-user beamforming apparatus is located on an evolved nodeB.

* * * * *